2,854,245

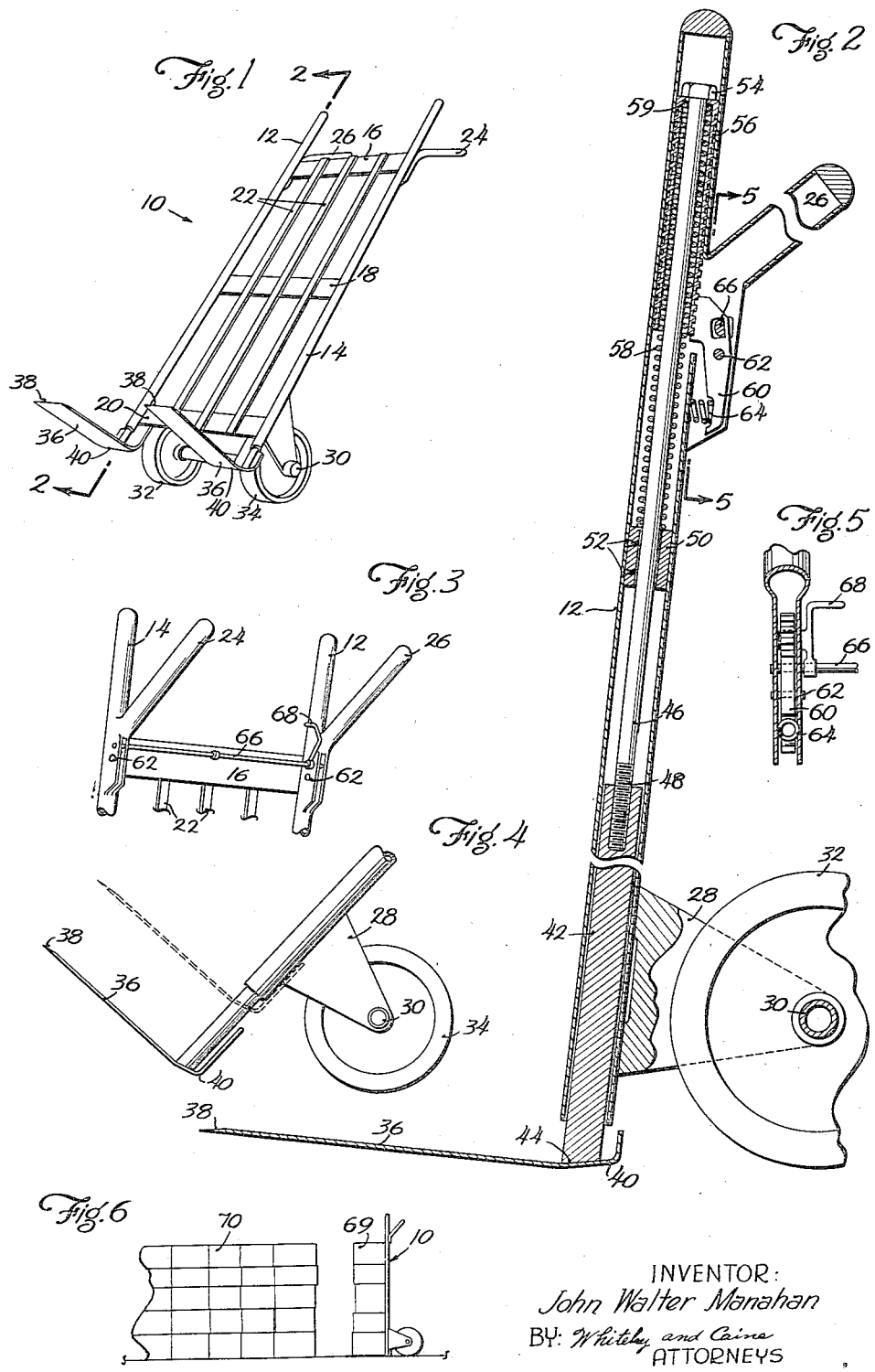
Sept. 30, 1958    J. W. MANAHAN    2,854,245
TWO WHEEL WAREHOUSE TRUCK WITH MOVABLE TOE
Filed Jan. 24, 1955
INVENTOR:
John Walter Manahan
BY: Whitely and Caine
ATTORNEYS

TWO WHEEL WAREHOUSE TRUCK WITH MOVABLE TOE

John Walter Manahan, Goodhue, Minn., assignor of one-half to Ore Oelkers, Mazeppa, Minn.

Application January 24, 1955, Serial No. 483,534

3 Claims. (Cl. 280—47.29)

This invention relates to improvements in a two wheel hand truck intended for warehouse use and the like. In general the invention is concerned with the construction of a two wheel hand truck in such a manner as to enable an operator to handle heavier loads, or loads in which the center of gravity may vary, by being able to easily shift the fulcrum of the truck in accordance with the center of gravity of the load. More particularly, the invention is concerned with a truck of the class described, in which the fulcrum can be varied by the operator as he tilts the truck to transfer the weight of the load from the floor to the wheels, to obtain a leverage which corresponds with the center of gravity of the load being transported. Another important feature of the invention is the provision of a truck wherein the fulcrum can be shifted to enable an operator to pick up a group of stacked objects and transport and deposit them in a stacked relationship at the point of delivery.

A two wheel truck for general warehouse use should have several desirable characteristics, the combination of which, insofar as I am aware, are not present in existing trucks. Primarily the truck should be adaptable for use with loads of varying weights and having variable centers of gravity, since these factors will differ in the various types of loads for which the truck is used. Also the truck should be constructed in such a manner that it can be easily used by men of differing heights, for it will be recognized that a truck constructed for use by a tall man creates a different load carrying characteristic when used by a shorter man. Still further, a truck of this general type should be capable of picking up a group of stacked objects and depositing them in a properly stacked relationship at the point of delivery. In order to accomplish these various purposes, the truck must be arranged to provide an adjustable fulcrum, but more particularly, the adjustment of the fulcrum must be under the control of the operator while he is transferring the load from the floor and tilting the same so as to be in balance above the axis of the wheels, and conversely, the truck must be capable of shifting the center of gravity as the load is deposited on the floor at the point of delivery so as to enable a plurality of objects that were picked up in a stacked condition to be deposited in the same relationship at the point of delivery.

In the present invention I have developed and disclose herein a two wheel hand truck embodying an upright frame, including tubular side rails in which are telescopically mounted rods that are slidably movable with respect to the frame and rigidly connected to a load supporting platform. The wheels are carried by the frame in such a position as to enable the truck, when not in use, to stand in an upright position so as to occupy a minimum of space and, therefore, be convenient for storage. At least one of the slidable rods is connected to a rack and a toothed sector to adjust the position of the rods, thereby adjusting the fulcrum of the platform with respect to the axis of the wheels, and a spring is provided for returning the rack to a position where the rods are telescoped within the frame to the maximum extent.

An object of the invention is to provide a two wheel truck in which the operator can adjust the fulcrum in accordance with the weight of the load and its center of gravity while transferring the load from the floor to the axis of the wheels.

A further object is to provide a two wheel truck capable of picking up a group of stacked objects forming the load and transferring the center of gravity of the objects to a point above the axis of the wheels by shifting the fulcrum of the truck in accordance with the center of gravity of the objects, and thereafter again shifting the center of gravity to permit setting the objects on the floor in an upright stack.

Other and further objects may become apparent from the following specification and claims and in the appended drawing in which:

Fig. 1 is a perspective of a two wheel truck forming the present invention;

Fig. 2 is a vertical section taken on line 2—2 of Fig. 1 with portions broken away to show interior construction;

Fig. 3 is a perspective of a fragmentary portion of the structure shown in Fig. 1 as seen from the rear side thereof;

Fig. 4 is a side elevation of the lower portion of the truck shown in Figs. 1 and 2;

Fig. 5 is a detail showing of the latching means taken on line 5—5 of Fig. 2; and, Fig. 6 is an illustration of the truck forming the present invention being used in transporting stacked objects.

Referring now to the several views of the drawing, the invention will be described in detail. General reference numeral 10 indicates in its entirety a two wheel warehouse truck composed of a pair of laterally spaced tubular side rails 12 and 14. Extending laterally between the side rails 12 and 14 are spaced supporting braces indicated at 16, 18, and 20. A plurality of vertical braces 22 join the several lateral braces 16, 18 and 20, and with the side rails 12 and 14 form the frame of the truck. As best seen in Fig. 3, a pair of handles 24, 26 extend angularly from the side rails 12 and 14. A pair of bosses, one of which is indicated in Figs. 2 and 4 by reference character 28 are welded onto the tubular side rails 12 and 14 and form journals for an axle 30 on which is mounted ground engaging wheels 32, 34.

As best seen in Figs. 1, 2 and 4, a pair of plates designated collectively by reference character 36 form a load supporting platform having a toe, indicated at 38 and a pivoting heel indicated at 40. The platform 36 is subject to modification in accordance with the type of packages or objects to be handled, and may, if necessary, consist of a single plate.

Referring now to Fig. 2, within each of the tubular side rails is a rod 42 which at its lower end 44 is rigidly secured to platform 36. Rods 42 are telescopically slidable with respect to the rails 12 and 14. Each of rods 42 are connected at their upper ends to a smaller rod 46 by a threaded connection 48. Rod 46 extends through a bushing 50 which is secured to tube 12 or 14 by suitable fastening means here shown as set screws 52. The upper end of rod 46 is provided with an enlarged head 54. Encircling the upper portion of rod 46 is a rack 56 which may take the form of a tubular member having a plurality of apertures formed therein. A relatively heavy spring 58 encompasses rod 46 and is anchored at its lower end in the bushing 50 and at its upper end to the upper limits of the rack 56 by a shoulder portion 59 which closely encloses rod 46 beneath the headed member 54.

Referring now to Figs. 2 and 5 is shown a sector 60 having a plurality of teeth that engage the teeth of rack 56. Each sector, of which only one is shown is mounted for pivotal movement on a pivot 62 and is biased against the teeth of rack 56 by a coil spring 64 extending between the side rail and a lower portion of the sector.

As best seen in Fig. 3 a rod 66 extends between the side rails 12 and 14 and carries a trigger-like lever 68 which is secured to rod 66 for disengaging the sectors 60 from the teeth of racks 56.

The operation of the invention will now be explained. With the parts in the position they would assume when the truck is standing upright, as in Fig. 6, the rods 42 are completely telescoped within their respective side rails 12 and 14, and the lower periphery of wheels 32, 34 are parallel with the lower surface of the load receiving platform 36, thereby permitting the truck to stand in an upright position without additional support. Having reference to Fig. 6, the truck is shown with a stack of objects 69 positioned on the platform 36 and under these circumstances the center of gravity of the load will be disposed over the center of platform 36. To transport the objects, the operator grasps handles 24, 26, and assuming the objects 69 to be relatively heavy, he simultaneously rotates the small trigger-like lever 68 with his thumb. This causes a rotation of rod 66 and the two sectors 60 on their pivots 62 disengaging their teeth from the teeth of racks 56. As the operator begins to exert pressure on the handles 24, 26, the rods 42, 46 begin to telescope from the side rails and since the racks 56 are free to move, the engaging heads 54 on the upper ends of the rods engage the racks 56 and move them downwardly within the tubes against the resilience of coil springs 58. As the frame begins to rotate or tilt on heel 40, the center of gravity of the load through the telescopic action of the rods shifts from the center of the platform 36 through the heel 40 towards the center of axle 30 until the desired tilt of the operator's choice is obtained. The operator can easily sense this point, whereupon the trigger-like lever 68 is released and springs 64 bias the sectors 60 into engagement with racks 56 to lock the racks with respect to rods 46. Thereafter the operator continues to exert pressure on handles 24, 26 transferring the weight of the load from heel 40 to axle 30, thereby raising the heel 40 and permitting mobility of the truck. When the place of delivery is reached, the action is reversed to the extent that the operator brings heel 40 into contact with the floor surface whereupon rods 42, 46 telescope within the side rails permitting the enlarged head portions 56 to move away from the shoulders 59 of racks 56. This causes an automatic shifting of the center of gravity from the heel 40 to the center of the platform 36, whereupon a group of objects 69 may be set next to a stack 70 and with the objects in an upright stacked position. Assuming the operator is transporting a more or less standard weight of objects for each trip, no further adjustment is required, since the truck has now been adjusted to the operator's desired balance. If, however, another operator having a different body height or length of arms uses the truck on such loads, a different fulcrum may be chosen. In that event, the new operator again rotates lever 68 releasing the racks and selecting the desired point of balance. If the leverage required by the new operator is less than that required by the previous operator, or loads of different weight or height are transported requiring a small leverage, the coil springs 58 are capable of moving the racks 56 in an upward direction provided no tension is present on the rods, and therefore the function of springs 58 is merely to return the racks 56 to an upper position in the tubes when desired change is required.

A primary advantage of the invention is that heavier loads may be handled with the truck described and claimed herein, than has been possible with prior art trucks.

Another advantage is that the truck is adaptable for use with loads of variable height from the floor surface.

Another advantage is that the truck is adaptable for use with equal ease by persons of differing heights which has not been possible with prior art trucks, for with prior art trucks a shorter man will greater difficulty in handling loads than a taller man.

A further advantage is that the operator can easily shift the center of gravity of the load while he is in the act of transferring the same from the floor to the heel of the load supporting member so as to enable him to balance much heavier loads on the truck.

A still further advantage of the truck forming the present invention is that loads consisting of a multiplicity of articles can be easily picked up from a stack and re-deposited in a stack.

As numerous changes may be apparent to those skilled in the art, my invention is not limited to the disclosure of the drawings, but is limited only to the extent of the appended claims.

I claim:

1. A warehouse truck, comprising a frame member, a load receiving member including a ground engaging pivot, a pair of ground engaging wheels secured to the frame, a pair of rods secured to the load receiving member and supported for telescopic movement relative to the frame member for varying the fulcrum between said members and the ground engaging wheels when the load receiving member is tilted on its ground engaging pivot, a tubular rack carried by the frame member and encircling the rod and being movable by the rod when the same extends in telescoping relationship with the frame, latch means carried by the frame and adapted for engagement with the rack to limit the movement of the rack and rod, and resilient means biasing the rack to a predetermined position relative to the latch.

2. A warehouse truck, comprising a frame including a pair of laterally spaced tubular side rails, a load receiving platform including a ground engaging heel portion, a pair of ground engaging wheels rigidly secured to the frame member adjacent each of the side rails, a pair of rods rigidly secured to the platform and extending telescopically within the side rails, an abutment secured to the inner end of one of the side rods, a tubular rack surrounding said rod within one of the side rails, a coil spring surrounding the rod and biasing the rack against said abutment, and a toothed sector carried by the frame and adapted to engage the rack to limit the movement of the rack and the rod in one direction.

3. A warehouse truck, comprising a frame member including tubular side rails, a load receiving member including a ground engaging pivot, a pair of ground engaging wheels secured to the frame, a pair of rods each secured at one end to the load receiving member and supported for telescopic movement within the side rails of the frame member for varying the fulcrum between said members and the ground engaging wheels when the load receiving member is tilted on its ground engaging pivot in the direction of the wheels, an abutment carried on the other end of at least one of said rods, a rack engaging said rod and supported for sliding movement within the corresponding side rail, said rack also extending in the path of movement of the abutment carried by said rod and adapted to slidably move with said rod when the latter is moved downwardly relative to said side rail, and a pivotally movable toothed sector supported adjacent the path of movement of the rack which is adapted to engage said rack to limit the movement thereof and fix the fulcrum, said rack permitting said rod to move in an upward direction and telescope within the side rail when the frame is tilted in the direction of the load receiving member.

References Cited in the file of this patent

UNITED STATES PATENTS

| | | |
|---|---|---|
| 552,696 | O'Neill | Jan. 7, 1896 |
| 849,996 | Hass | Apr. 9, 1907 |
| 1,649,940 | Willmot | Nov. 22, 1927 |
| 2,427,803 | Mueller | Sept. 23, 1947 |

FOREIGN PATENTS

| | | |
|---|---|---|
| 259,274 | Great Britain | Oct. 12, 1926 |